(12) United States Patent
Park et al.

(10) Patent No.: US 9,414,426 B2
(45) Date of Patent: Aug. 9, 2016

(54) METHOD AND APPARATUS FOR RECONNECTION IN SHORT-RANGE WIRELESS COMMUNICATION

(71) Applicant: Samsung Electronics Co., Ltd., Gyeonggi-do (KR)

(72) Inventors: Chun-Ho Park, Seoul (KR); Dae-Hui Kang, Gyeonggi-do (KR); Joo-Hyung Lee, Seoul (KR); Ji-Seon Hong, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 29 days.

(21) Appl. No.: 14/295,840

(22) Filed: Jun. 4, 2014

(65) Prior Publication Data

US 2015/0230285 A1 Aug. 13, 2015

(30) Foreign Application Priority Data

Feb. 10, 2014 (KR) ........................ 10-2014-0014819

(51) Int. Cl.
| | | |
|---|---|---|
| *H04B 7/00* | (2006.01) | |
| *H04W 4/00* | (2009.01) | |
| *H04W 76/02* | (2009.01) | |
| *H04W 84/18* | (2009.01) | |

(52) U.S. Cl.
CPC ............ *H04W 76/028* (2013.01); *H04W 4/008* (2013.01); *H04W 84/18* (2013.01)

(58) Field of Classification Search
CPC ... H04W 4/008; H04W 8/005; H04W 76/028; H04W 84/20
USPC ......... 455/41.2–41.3, 507, 517, 67.11, 67.16, 455/434, 515
See application file for complete search history.

(56) References Cited

U.S. PATENT DOCUMENTS

| | | | |
|---|---|---|---|
| 2009/0073870 A1 | 3/2009 | Haartsen et al. | |
| 2010/0112950 A1* | 5/2010 | Haartsen .............. | H04B 5/0056 455/41.3 |
| 2011/0021142 A1* | 1/2011 | Desai .................... | H04W 8/005 455/41.2 |
| 2011/0045771 A1* | 2/2011 | Sen ....................... | H04W 8/005 455/41.2 |
| 2013/0003715 A1* | 1/2013 | Xhafa ............... | H04W 52/0229 370/349 |
| 2013/0040574 A1* | 2/2013 | Hillyard ............... | H04W 8/005 455/41.2 |
| 2013/0090061 A1* | 4/2013 | Linde .................... | H04W 8/005 455/41.2 |
| 2013/0326495 A1* | 12/2013 | Reunamaki ........... | H04W 4/008 717/173 |
| 2014/0057564 A1* | 2/2014 | Palin ..................... | H04W 8/005 455/41.2 |
| 2014/0086125 A1* | 3/2014 | Polo .................. | H04W 52/0229 370/311 |
| 2014/0169599 A1* | 6/2014 | Solum .................. | H04R 25/554 381/315 |
| 2014/0357192 A1* | 12/2014 | Azogui ................... | H04B 7/26 455/41.2 |

FOREIGN PATENT DOCUMENTS

KR 1020100070875 6/2010

* cited by examiner

*Primary Examiner* — Simon Nguyen
(74) *Attorney, Agent, or Firm* — The Farrell Law Firm, P.C.

(57) ABSTRACT

A method of reconnecting communication with a second device by a first device in short-range wireless communication is provided. The method includes, when it is determined that a link loss is generated at a link with the second device, adjusting a scanning period of advertisement data broadcasted by the second device and a size of a scan window in which the scanning is performed, according to a time during which the link loss continues; and scanning the advertisement data at each of the adjusted scanning periods in the scan window corresponding to the adjusted size.

20 Claims, 10 Drawing Sheets

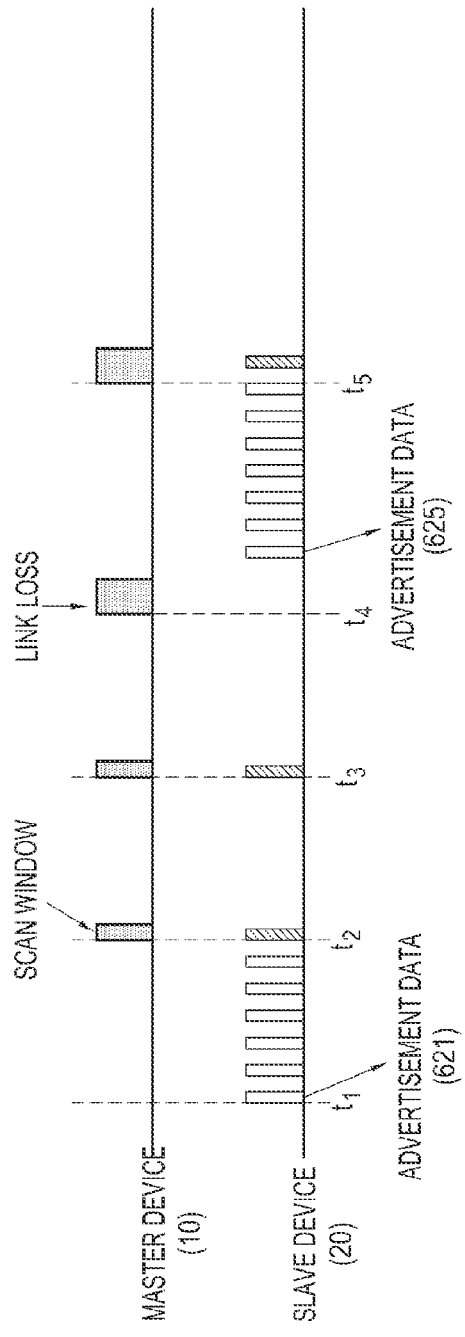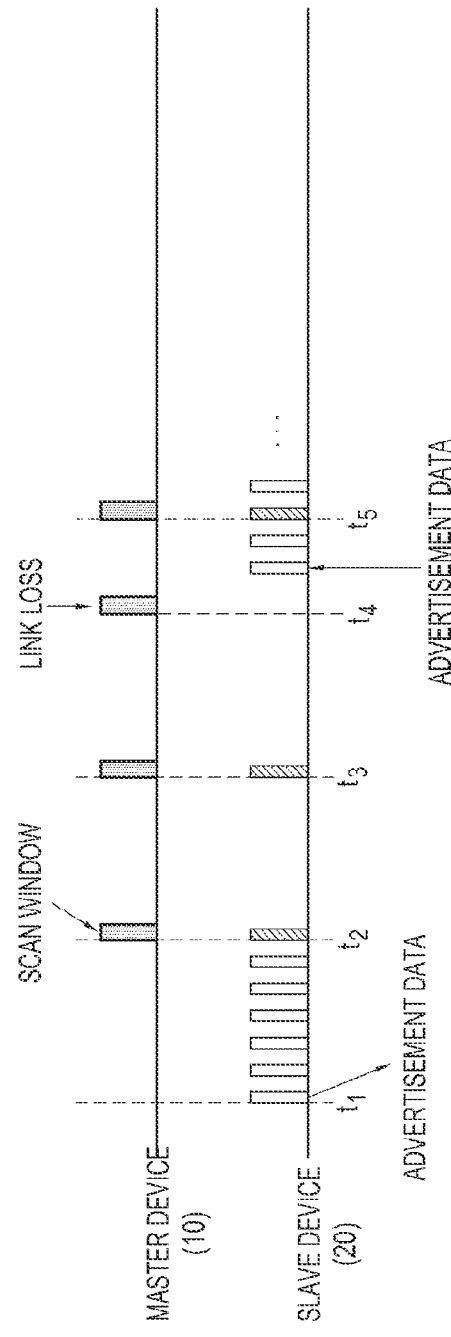

METHOD AND APPARATUS FOR RECONNECTION IN SHORT-RANGE WIRELESS COMMUNICATION

PRIORITY

This application claims priority under 35 U.S.C. §119(a) to Korean Application Serial No. 10-2014-0014819, which was filed in the Korean Intellectual Property Office on Feb. 10, 2014, the entire content of which is incorporated herein by reference.

BACKGROUND

1. Field of the Disclosure

The present disclosure generally relates to a method and an apparatus for reconnecting communication between electronic devices in short-range wireless communication.

2. Description of the Related Art

Various electronic devices, e.g. mobile apparatuses, include a wireless communication function. A protocol or a process for wireless communication between the electronic devices has also been established in accordance with the wireless communication function.

For example, Bluetooth, Wi-Fi Direct, Peer to Peer (P2P), etc., have been known as direct short-range communication protocols between the electronic devices. The electronic devices may exchange data or control information with each other by using such short-range communication protocols.

Here, the Bluetooth may be implemented by a Bluetooth Low Energy (BLE) in order to increase a communication lifespan of sensor devices operated by electric power of a battery.

Using BLE, devices operated by battery (e.g. coin cell battery) can operate for several months or several years with low electric power.

FIG. 1 illustrates electronic devices which perform general short-range communication. Referring to FIG. 1, a smart phone 10 and BLE devices 21 and 22 may perform BLE communication. The BLE devices 21 and 22 include, for example, a smart watch 21 which has a form and a function which are similar to those of a general watch and can perform in conjunction with other electronic devices, and smart glasses 22 which have a form of glasses and can display information transmitted from other electronic devices.

In general, the BLE communication is performed between a master device and a slave device. The slave device broadcasts advertisement data through an advertising channel in order to advertise its existence. The master device scans the advertising channel by opening a scan window at each predetermined time cycle. When the master device scans the broadcasted advertisement data from the slave device at a specific cycle, a link between the two devices may be generated. Further, a link between the two devices may not be generated according to the advertisement data of the slave device. In the Bluetooth standard, whether a connection is made or not in BLE may be determined according to a Protocol Data Unit (PDU) included in an advertising event type. Table 1 relates to types of the PDU according to the advertising event type (PDU used in this advertising event type), and an allowable response according to the corresponding types of the PDU (Allowable response PDUs for advertising event). Referring to Table 1, for example, in order not to generate the link, the slave device sets the advertising event type as "non-connectable Undirected Event", so that the slave device may broadcast advertisement data including a PDU of "ADC_NONCONN_IND". Since the advertisement data including the PDU of "ADV_NONCONN_IND" does not allow a response for a connection request CONNECT_REQ, the link generation is impossible.

TABLE 1

| Advertising Event Type | PDU used in this advertising event type | Allowable response PDUs for advertising event | |
|---|---|---|---|
| | | SCAN_REQ | CONNECT_REQ |
| Connectable Undirected Event | ADV_IND | YES | YES |
| Connectable Directed Event | ADV_DIRECT_IND | NO | YES |
| Non-connectable Undirected Event | ADV_NONCONN_IND | NO | NO |
| Scannable Undirected Event | ADV_SCAN_IND | YES | NO |

For example, in FIG. 1, the smartphone 10 may correspond to the master device, and the smart watch 21 and the smart glasses 22 may correspond to the slave device. Meanwhile, link loss may occur in the link set for the BLE communication without a disconnection operation of a user. For example, when the electronic devices become separated from each other by a distance greater than a distance within which the short-range communication can be performed, or when an obstacle is placed between the electronic devices, the link loss may occur. As another reason, when the electronic device cannot receive communication data through the link for a predetermined time period, it is determined that the link loss occurs.

As indicated by reference numeral 110, FIG. 1 is based on an assumption that link loss occurs in link generated between the smartphone 10 and the smart watch 21.

At this time, as indicated by reference numeral 120, an operation of reconnection between the smartphone 10 and the smart watch 21 may be performed. In detail, the smart watch 21 broadcasts the advertisement data, and the smartphone 10 scans the advertisement data in a scan window. Thereafter, when the smartphone 10 scans the advertisement data broadcasted by the smart watch 21, the smartphone 10 and the smart watch 21 may be reconnected.

FIG. 2 illustrates signal timing for connection and reconnection between devices in general short-range communication. Referring to FIG. 2, the slave device 20 cyclically broadcasts advertisement data 221 at a time point t1. Thereafter, when the master device 10 scans the advertisement data 221 through a scan window at a time point of t2, a link (i.e., a connection) for transmitting/receiving communication data between the master device 10 and the slave device 20 may be generated. Thereafter, the master device 10 requests the slave device 20 to perform the connection. When the slave device 20 accepts the connection request of the master device 10, the slave device 20 transmits communication data at a predetermined period, e.g. time points t2 and t3. Meanwhile, when the master device 10 does not continuously receive data transmitted from the slave device 20 at a time point t4, the master device 10 and the slave device 20 determine that link loss is generated. For example, in accordance with the Bluetooth standard, when the master device 10 does not continuously receive data for six times, the master device 10 can identify that the link loss is generated. Alternatively, when the master device 10 does not detect data, although the slave device 20 has transmitted the data, and the slave device 20 does not receive feedback for the transmission data, the master device 10 and the slave device 20 determine that the link loss is generated. The master device 10 cyclically scans an advertising channel again from a time point t5 after the link loss in order to reconnect. Here, the scan window size can be preset to be 11.52 milliseconds and the scanning period may be preset to be 1.28 seconds according to the Bluetooth standard. Meanwhile, the slave device 20, which has detected the link loss, broadcasts the advertisement data 227 again.

Thereafter, when the master device 10 scans the advertisement data of the slave device 20, the master device 10 and the slave device 20 are reconnected with each other at a time point t6 so as to cyclically perform communication.

In order to reduce power consumption of a master device, broadcasting data may be scanned when a scan window size is set to be reduced and a scanning period is set to be lengthened. In this case, the scanning period of the scan window and the broadcasting period of the advertisement data can deviate from each other, so that the probability that the master device scans advertisement data is decreased. For example, when the scan window size is 11.52 milliseconds and the scanning period is 1.28 seconds according to the Bluetooth standard, and when the advertisement data transmitted from a slave device at a period of 500 milliseconds is scanned, about 46 seconds may be averagely consumed until the master device scans the advertisement data of the slave device. As another example, when the advertisement data transmitted at a period of 1.28 seconds is scanned, 1 minute 40 seconds may be consumed until the scanning is completed.

Meanwhile, when the scanning period of the scan window is set to be shortened and the scan window size is set to be enlarged, a probability that the master device scans the advertisement data is increased. However, the power consumption of the master device is increased in proportion to the changed setting.

SUMMARY

The present disclosure has been made to address the above problems and disadvantages, and to provide at least the advantages described below. Accordingly, an aspect of the present disclosure provides a method of increasing a probability to scan the advertisement data while reducing the power consumption of the master device.

Another aspect of the present disclosure provides a method of setting the scan window size and the scanning period of the scan window according to a time when link loss is generated.

Another aspect of the present disclosure provides a method in which the master device acquires an advertisement data transmission period from the slave device, and the scan window size and the scanning period of the scan window are set according to the acquired advertisement data transmission period.

Another aspect of the present disclosure provides a method of synchronizing the scanning period of the scan window and the advertisement data transmission period.

In accordance with an aspect of the present disclosure, a method of reconnecting communication with a second device by a first device in short-range wireless communication is provided. The method includes, when it is determined that a link loss is generated at a link with the second device, adjusting a scanning period of advertisement data broadcasted by the second device and a size of a scan window in which scanning is performed, according to a time during which the link loss continues; and scanning the advertisement data at each of the adjusted scanning periods in the scan window corresponding to the adjusted size.

In accordance with another aspect of the present disclosure, a method of reconnecting communication with a second device by a first device in short-range wireless communication is provided. The method includes, when it is determined that link loss is generated at link with the second device, identifying a broadcasting period of advertisement data transmitted from the second device; identifying a target time value for reconnection with the second device; adjusting a size of a scan window in consideration of the broadcasting period and the target time value; and scanning the advertisement data in the scan window corresponding to the adjusted size.

In accordance with yet another aspect of the present disclosure, a method of reconnecting communication with a second device by a first device in short-range wireless communication is provided. The method includes determining a scanning period of advertisement data broadcasted from the second device through communication with the second device; when it is determined that link loss is generated at link with the second device, adjusting the scanning period of the advertisement data broadcasted from the second device to the determined period; and scanning the advertisement data at each of the adjusted scanning periods.

In accordance with another aspect of the present disclosure, a method of reconnecting communication with a first device by a second device in short-range wireless communication is provided. The method includes receiving an advertisement data transmission period request from the first device; and transmitting, to the first device, a period in which the second device transmits advertisement data, in response to the request.

In accordance with yet another aspect of the present disclosure, a method of reconnecting communication with a first device by a second device in short-range wireless communication is provided. The method includes determining a transmission period of advertisement data broadcasted to the first device, through communication with the first device; when link loss is generated at a link with the first device, adjusting the transmission period of the advertisement data broadcasted to the first device to the determined period; and broadcasting the advertisement data at each adjusted transmission period.

In accordance with an aspect of the present disclosure, a first device for reconnecting communication with a second device in short-range wireless communication is provided. The first device includes a controller that, when a link loss is generated at a link with the second device, adjusts a scanning period of advertisement data broadcasted by the second device and a size of a scan window in which the scanning is performed, according to a time during which the link loss continues; and a short-range communication unit that scans the advertisement data at each of the adjusted scanning periods in the scan window corresponding to the adjusted size.

In accordance with another aspect of the present disclosure, a first device for reconnecting communication with a second device in short-range wireless communication is provided. The first device includes a controller that, when it is determined that link loss is generated at a link with the second device, identifies a broadcasting period of advertisement data transmitted from the second device, identifies a target time value for reconnection with the second device, and adjusts a size of a scan window in consideration of the broadcasting period and the target time value; and a short-range communication unit that scans the advertisement data in the scan window corresponding to the adjusted size.

In accordance with yet another aspect of the present disclosure, a first device for reconnecting communication with a second device in short-range wireless communication is provided. The first device includes a controller that determines a scanning period of advertisement data broadcasted from the second device through communication with the second device, and when it is determined that link loss is generated at a link with the second device, adjusts the scanning period of the advertisement data broadcasted from the second device to the determined period; and a short-range communication unit that scans the advertisement data at each of the adjusted scanning periods.

In accordance with another aspect of the present disclosure, a second device for reconnecting communication with a first device in short-range wireless communication is provided. The second device includes a short-range communication unit that receives an advertisement data transmission period request from the first device; and a controller that transmits, to the first device, a period in which the second device transmits advertisement data, in response to the request.

In accordance with yet another aspect of the present disclosure, a second device for reconnecting communication with a first device in short-range wireless communication is provided. The second device includes a controller that determines a transmission period of advertisement data broadcasted to the first device, through communication with the first device, and when it is determined that link loss is generated at a link with the first device, adjusts the transmission period of the advertisement data broadcasted to the first device to the determined period; and a short-range communication unit that broadcasts the advertisement data at each adjusted transmission period.

BRIEF DESCRIPTION OF THE DRAWINGS

The above and other aspects, features, and advantages of the present disclosure will be more apparent from the following detailed description taken in conjunction with the accompanying drawings, in which:

FIGS. 7A and 7B illustrate signal timing generated for connection and reconnection between devices according to another embodiment of the present disclosure;

DETAILED DESCRIPTION OF EMBODIMENTS OF THE PRESENT DISCLOSURE

Figure 1:
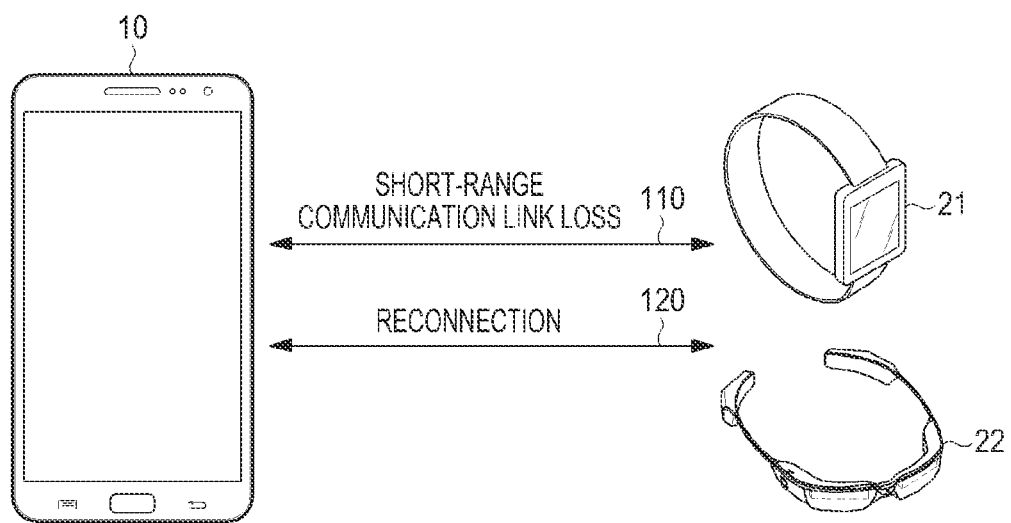
FIG. 1 illustrates electronic devices which perform general short-range communication.
Figure 2:
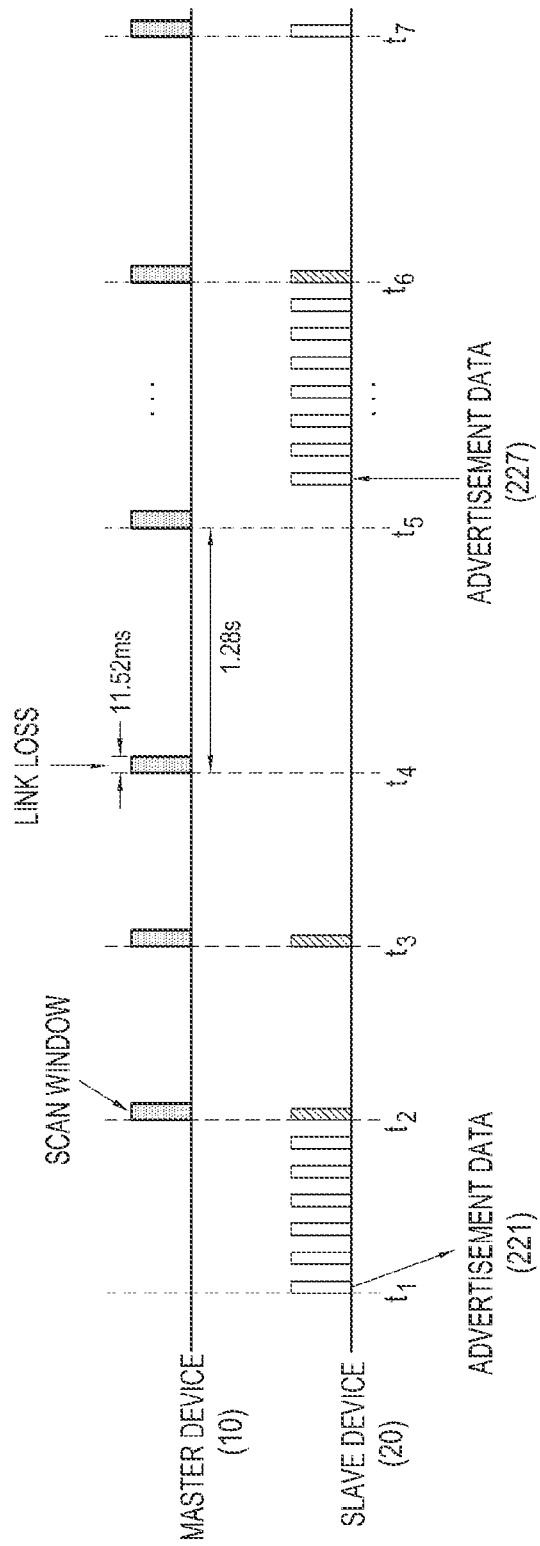
FIG. 2 illustrates signal timing for connection and reconnection between devices in general short-range communication.

Various embodiments will now be described more fully with reference to the accompanying drawings in which some embodiments are shown. Therefore, it should be understood that there is no intent to limit embodiments to the particular forms disclosed, but on the contrary, embodiments are to cover all modifications, equivalents, and alternatives falling within the scope of the disclosure.

Terms including ordinal numerals such as "first", "second", and the like can be used to describe various structural elements, but the structural elements are not limited by these terms. The terms are used only to distinguish one structural element from another structural element. For example, without departing from the scope of the present disclosure, a first structural element may be named a second structural element. Similarly, the second structural element also may be named the first structural element. The terms "and/or" includes combinations of a plurality of related items or a certain item among the plurality of related items.

The terms used in this application are for the purpose of describing particular embodiments only and are not intended to be limiting of the disclosure. As used herein, the singular forms are intended to include the plural forms as well, unless the context clearly indicates otherwise. In the description, it should be understood that the terms "include" or "have" indicate existences of a feature, a number, a operation, an operation, a structural element, parts, or a combination thereof, and do not previously exclude the existences or probability of addition of one or more another features, numeral, operations, operations, structural elements, parts, or combinations thereof.

Unless defined differently, all terms used herein, which include technical terminologies or scientific terminologies, have the same meaning as understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to embodiments of the present disclosure may be a device including a communication function. For example, the electronic device may be a combination of one or more of a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, an electronic bracelet, an electronic necklace, an electronic appcessory, a camera, a wearable device, an electronic clock, a wrist watch, a home appliance (e.g. a refrigerator, an air conditioner, a cleaner, an oven, a microwave oven, a washing machine, a vacuum cleaner, etc.), an artificial intelligent robot, a Television (TV), a Digital Video Disk (DVD) player, an audio player, various medical machines (e.g. a Magnetic Resonance Angiography (MRA), a Magnetic Resonance Imaging (MRI), a Computed Tomography (CT), a tomography camera, a sonography device, etc.), a navigation device, a Global Positioning System (GPS) receiver, an Event Data Recorder (EDR), a Flight Data Recorder (FDR), a set-top box, a TV box (e.g. SamSung HomeSync™, Apple TV™, or Google TV™), an electronic dictionary, a vehicle infotainment device, electronic equipment for a ship (e.g. navigation equipment for a ship, a gyrocompass, etc.), avionic equipment, a security device, an electronic cloth, an electronic key, a camcorder, a game console, a Head-Mounted Display (HMD), a flat panel display device, an electronic frame, an electronic album, a furniture or a part of a building/structure including a communication function, an electronic board, an electronic signature receiving device, a projector, etc. It is obvious to those skilled in the art that the electronic device according to the present disclosure is not limited to the aforementioned devices.

In accordance with various embodiments of the present disclosure, a probability to scan advertisement data can be increased by setting a scan window size and a scanning period of the scan window according to a time when link loss is generated, an advertisement data transmission period, or an advertisement data transmission period for reconnection of a slave device. Further, since the scanning is performed according to the probability that the advertisement data is scanned, power consumption can be reduced.

Figure 3:
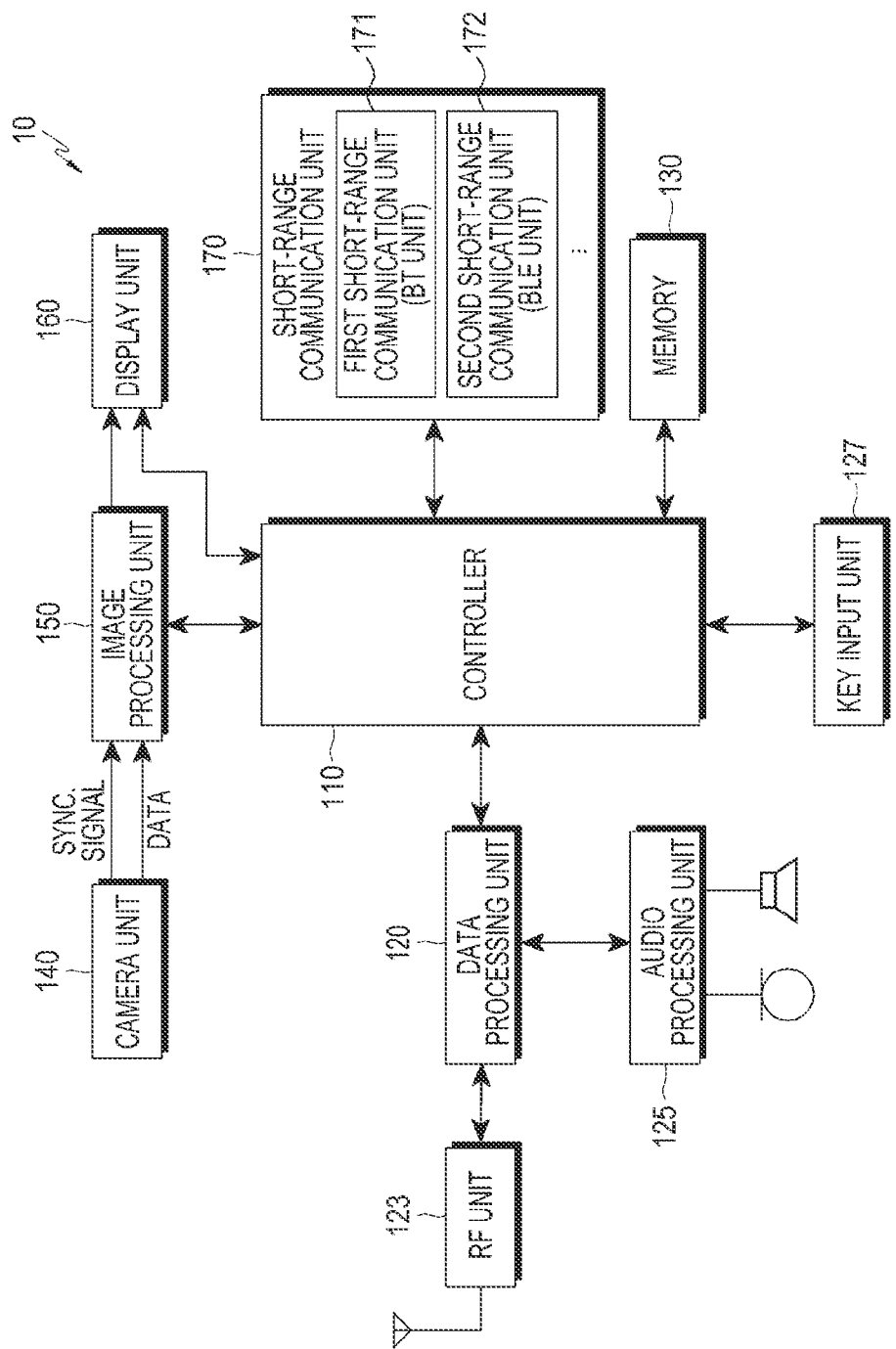
FIG. 3 illustrates a block diagram of a portable terminal to which a device according to embodiments of the present disclosure is applied.

FIG. 3 illustrates a block diagram of a portable terminal to which a device according to the present disclosure is applied. A master device described herein may have a configuration the same as or similar to the configuration illustrated in the FIG. 3. Further, it is characterized that a short-range communication unit of a slave device described herein is a second short-range communication unit, and other configurations thereof may have configurations the same as or similar to configurations illustrated in FIG. 3.

Referring to FIG. 3, an electronic device 10 has a Radio Frequency (RF) unit 123, and the RF unit 123 performs a wireless communication function of the electronic device 10.

A data processing unit 120 may include a transmitter which encodes and modulates a signal to be transmitted, a receiver which decodes and demodulates the received signal, etc.

An audio processing unit 125 may perform a function of reproducing a received audio signal output from an audio codec of the data processing unit 120 or transmitting a transmitted audio signal generated from a microphone to the audio codec of the data processing unit 120.

A key input unit 127 may include keys for inputting number and character information and function keys for setting various functions.

A memory 130 may include a program memory and data memories. The program memory may store programs for controlling a general operation of the electronic device and programs for performing a control to reconnect short-range communication when link loss of the short-range communication is generated. The data memory may store information when advertisement data broadcasted by a specific device according to a size or a scanning period of a scan window can be found. Further, the data memory may perform a function of temporarily storing data generated while the programs are executed. For example, the data memory may store error values generated while identifying each link at a time of the link.

A controller 110 performs a function of controlling an overall operation of the electronic device. For example, when it is detected that link loss is generated at a link with another electronic device, a period in which advertisement data broadcasted by the another electronic device is scanned and the scan window size where the scanning is performed are adjusted according to a time during which the link loss has occurred. As another example, when it is determined that link loss is generated at a link with another electronic device, a broadcasting period of the advertisement data transmitted by the another electronic device is identified, a target time value for reconnection with the another electronic device is identified, and the scan window size can be adjusted considering the broadcasting period and the target time value. As yet another example, a scanning period of the advertisement data broadcasted from another electronic device is determined through communication with the another electronic device, and when it is determined that link loss is generated at a link with the another electronic device, the scanning period of the advertisement data broadcasted from the another electronic device is adjusted to be the determined period. As a modified example of the yet another example, a control is performed to previously store an error value generated while identifying the link with another device at a time of the link. Thereafter, when the link loss is detected, the broadcasting period of the advertisement data or the scanning period of the scan window can be updated using the stored error value.

A camera unit 140 photographs image data, and includes a camera sensor for converting a photographed optical signal to an electrical signal and a signal processing unit for converting a photographed analog image signal to digital data.

An image processing unit 150 performs an Image Signal Processing (ISP) for displaying an image signal output from the camera unit 140 on a display unit 160.

The display unit 160 displays an image signal output form the image processing unit on a screen. Further, when the display unit 160 is used as a touch screen unit as the display unit 160 is realized in the touch screen scheme, the touch screen unit may be formed by a Touch Screen Panel (TSP) including a plurality of sensor panels, and the plurality of sensor panels may include a capacitive sensor panel which can recognize a hand touch and an electromagnetic sensor panel which can detect a minimized touch such as a touch pen.

A short-range communication unit 170 can provide a short-range wireless communication function. The short-range communication unit 170 may include a first short-range communication unit 171 and the second short-range communication unit 172 according to various embodiments of the present disclosure. Here, the first short-range communication unit 171 and the second short-range communication unit 172 are described as separate parts. However, in another embodiment, the first short-range communication unit 171 and the second short-range communication unit 172 may be an integrated singular unit. Further, in yet another embodiment, the second short-range communication unit 172 may operate as the short-range communication unit 170.

Here, the electronic device may have the first short-range communication unit 171 consuming a first electric power amount and the second short-range communication unit 172 consuming a second electric power amount. The second electric power amount may be less than the first electric power amount. In other words, the second short-range communication unit 172 may consume an amount of electric power that is less than that of the first short-range communication unit 171.

Here, the first short-range communication unit 171 includes a communication unit (hereinafter, referred to as a "BlueTooth (BT) unit") which uses a Bluetooth protocol, and the second short-range communication unit 172 may include a communication unit (hereinafter, referred to as a "BLE unit") which uses a Bluetooth Low Energy (BLE) protocol. Here, power consumption during operation or an amount of power consumption of the second short-range communication unit 172 may be less than that of the first short-range communication unit 171. In another embodiment, those skilled in the art can well understand that the electronic device may include the first short-range communication unit 171 and the second short-range communication unit 172 which are configured in various other combinations.

The second short-range communication unit 172 may scan advertisement data broadcasted from another electronic device through a scanning operation, and may transmit, to the controller 110, a message informing detection of address information of the another electronic device when there is address information of the electronic device 10 in the advertisement data. Further, before or after the transmitting, to the controller 110, of the message informing detection of address information of the another electronic device, the second short-range communication unit 172 requests the another electronic device to perform second short-range communication link therewith so that the second short-range communication link may be performed with the another electronic device.

Figure 4:
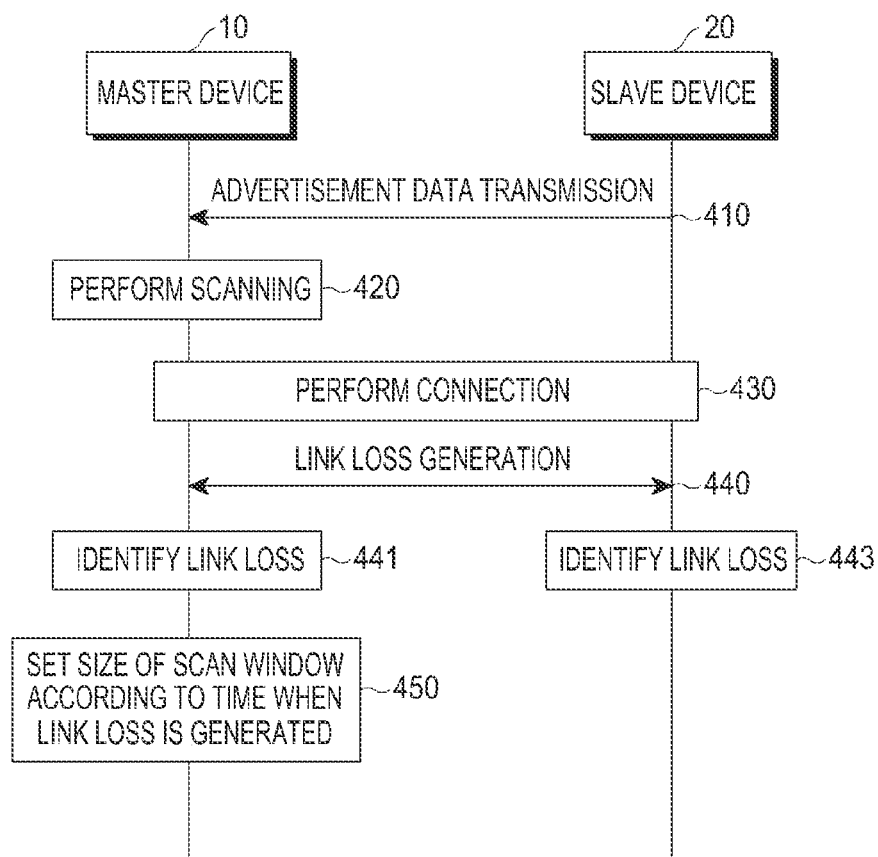
FIG. 4 is a signal flow diagram illustrating an operation of reconnecting a master device and a slave device according to an embodiment of the present disclosure.

FIG. 4 is a signal flow diagram illustrating an operation of reconnecting a master device and a slave device according to an embodiment of the present disclosure. Referring to FIG. 4, in operation 410, the slave device 20 broadcasts advertisement data at an initial stage in order to perform the BLE communication. Thereafter, in operation 420, the master device 10 scans advertisement data. In operation 430, the master device 10 and the slave device 20 are connected. Further, link loss may be generated as illustrated in operation 440. Thereafter, the master device 10 and the slave device 20 detect link loss, in operations 441 and 443, respectively. At this time, when the master device 10 and the slave device 20 want to perform reconnection after the link loss, the master device 10 scans the advertisement data again, and the slave device 20 performs an operation of broadcasting the advertisement data again.

In operation 450, the master device 10 may set the scan window size and the period for the reconnection. In detail, the master device 10 detects the link loss, and sets a duty cycle of the scan window to be 50% for an initial time of 50 seconds. For example, the size and the scanning period of the scan window may be set to be 30 milliseconds and 60 milliseconds, respectively. In this state, when the master device 10 does not detect the advertisement data of the slave device and a time when the link loss is detected exceeds 50 seconds, the master device 10 may set the size and the scanning period of the scan window to be values proposed in the Bluetooth standard.

The size $T_{GAP}$(auto_conn_est_scan_wind) of the scan window and the scanning period $T_{GAP}$(auto_conn_est_scan_int) which are proposed in the Bluetooth standard are expressed in Table 2.

TABLE 2

| Timer name | Value | Description | Requirement or Recommendation |
|---|---|---|---|
| $T_{GAP}$(auto_conn_est_scan_int) | 1.28 s | Scan interval used in the auto connection establishment procedure | Recommended value |
| $T_{GAP}$(auto_conn_est_scan wind) | 11.25 ms | Scan window used in the auto connection establishment procedure | Recommended value |

As in the description for FIG. 4, the master device according to an embodiment of the present disclosure may set a variable scan window size in consideration of the time when the link loss is detected. Meanwhile, the master device may set the scan window size by using information received from the slave device in addition to the detected link loss time. A detailed description for this will be described below with reference to FIGS. 5 and 6.

Figure 5:
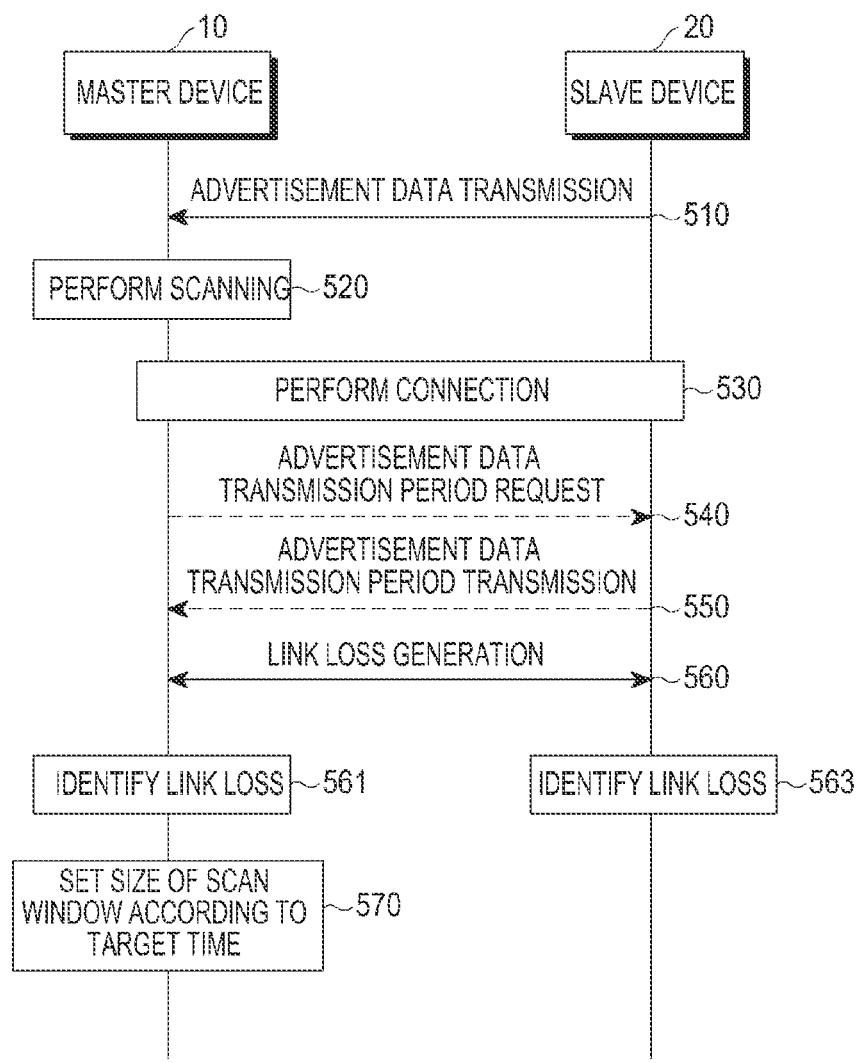
FIG. 5 is a signal flow diagram illustrating a method of reconnecting a master device and a slave device according to another embodiment of the present disclosure.

FIG. 5 is a signal flow diagram illustrating a method of reconnecting a master device and a slave device according to another embodiment of the present disclosure. Referring to FIG. 5, the slave device 20 broadcasts advertisement data at an initial stage in order to perform the initial BLE communication. Thereafter, in operation 520, the master device 10 scans advertisement data. In operation 530, the master device 10 and the slave device 20 is connected.

In operation 540, the master device 10 requests the slave device 20 to transmit an advertisement data transmission period. In operation 550, the slave device 20 transmits the advertisement data transmission period, to the master device 10. Further, the slave device 20 may transmit its advertisement data transmission period to the master device 10 although is has not received the advertisement data transmission period request. Further, the master device 10 may omit operation 540, and operation 550 may be performed when operation 550 is included in operation 510. That is, the master device 10 may also identify the advertisement data transmission period through the advertisement data which the slave device 20 transmits at an initial stage, without the request for transmitting the advertisement data transmission period. For example, data maximally having 31 bytes may be included in the advertisement data.

In operation 560, the link loss between the master device 10 and the slave device 20 may be generated. Thereafter, the master device 10 and the slave device 20 identify the link loss, in operations 561 and 563, respectively.

In operation 570, the master device 10 sets the scan window size according to a target time. In detail, the master device 10 first identifies the target time. Here, the target time is a value for performing reconnection within a determined time range when the link loss between the master device 10 and the slave device 20 is generated. Further, the master device may set the target time as a value included in information on a target time spent for finding a specific device. That is, the target time is a set value for a time in which the master device 10 aims to be reconnected with the slave device.

Further, the master device 10 stores information on a discovery probability which corresponds to a probability value of that the slave device is discovered in comparison with the scan window size according to a specific advertisement data transmission period. Here, the discovery probability may be calculated according to a calculation equation. For example, the master device may be calculate a time when a specific slave device is discovered, with a discovery probability for the corresponding slave device and stores the time as the target time. Further, the master device 10 may store information on a discovery probability of the corresponding slave device in comparison with the scanning period with respect to a specific advertisement data transmission period. Such a master device 10 may identify the received advertisement data transmission period and the target time and may set the scan window size or the scanning period according to the pre-stored information on the discovery probability of the corresponding slave device. Thus, a suitable scan window size and a suitable scanning period can be set while maintaining a proper probability to discover a specific slave device within the target time. Hereinafter, the scanning period and the scan window size which the master device stores with respect to the specific advertisement data transmission period, and the information on the discovery probability according to the scanning period and the scan window size will be described below with reference to Table 3.

Table 3 relates to a scan interval and a scan window size when the advertisement data transmission period is 800 milliseconds, and information on a discovery probability according to the scan interval and the scan window size, according to an embodiment of the present disclosure.

TABLE 3

| Scan interval (s) | Scan window size (ms) | Average (s) | Standard Deviation (s) |
| --- | --- | --- | --- |
| 1.28 | 80 | 8.78 | 7.77 |
| 1.28 | 160 | 3.54 | 3.46 |
| 1.28 | 320 | 1.33 | 1.16 |
| 1.28 | 640 | 0.58 | 0.54 |

Referring to Table 3, a discovery time may be, for example, an average and a standard deviation of a discovery probability distribution. As the scan window size becomes larger, the discovery time, which is a time within which the slave device can be discovered, averagely becomes smaller. Further, as the scan window size becomes larger, the standard deviation becomes smaller. This fact implies that a probability to discover the slave device within a discovery time that is close to the corresponding average time becomes higher as the master device sets the scan window size to be larger.

The master device according to an embodiment of the present disclosure may store such discovery time information and may identify whether the time within which the corresponding slave device may be discovered is included within the average value with the standard deviation value of the discovery time. Thereafter, the master device may set the identified discovery time information as a target time, and may set a scan window size corresponding to the target time.

Figure 6A:
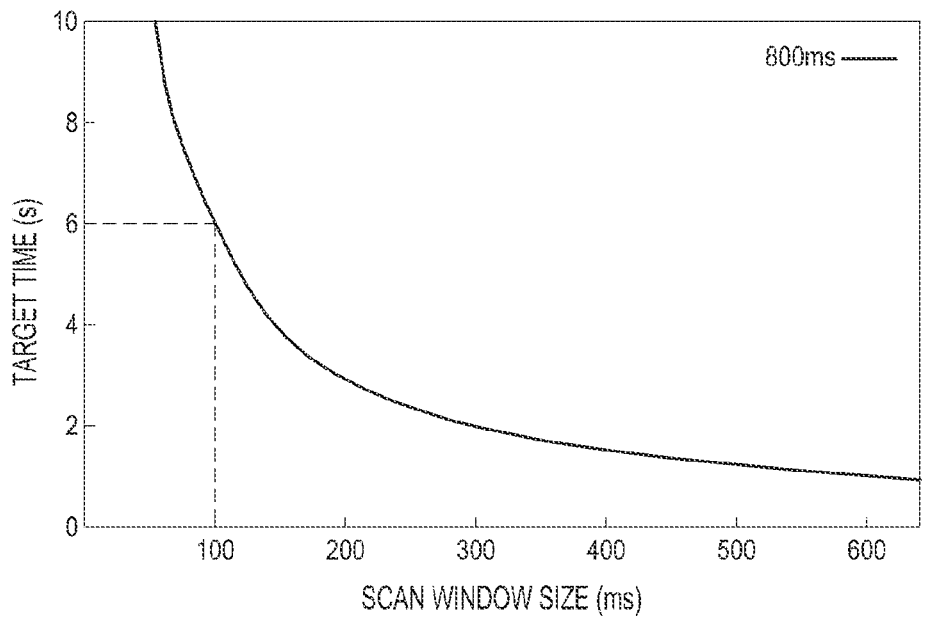
FIGS. 6A and 6B are graphs depicting relations between a target time for each advertisement data transmission period of a slave device and a scan window size according to another embodiment of the present disclosure.
Figure 6B:
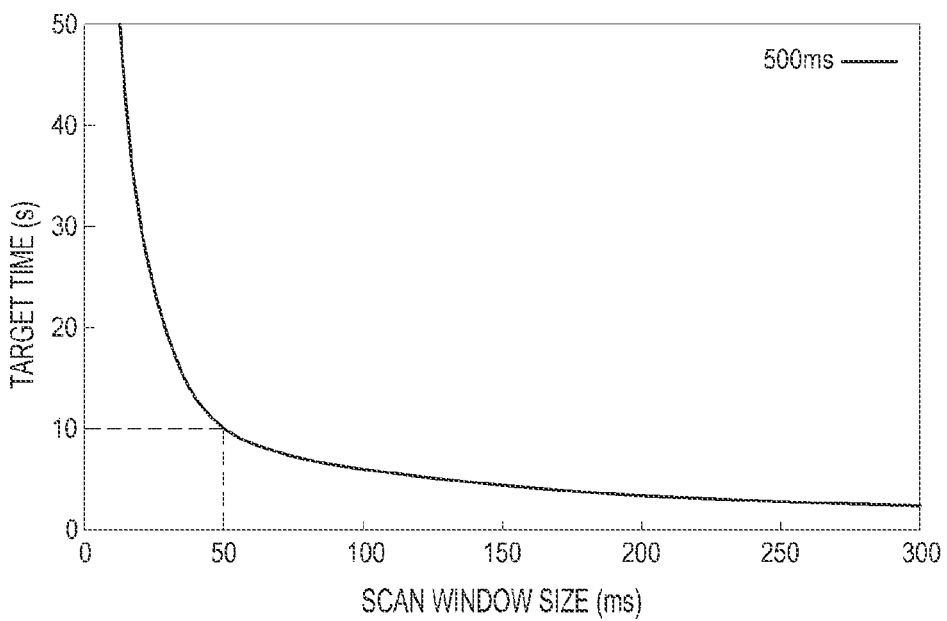

FIG. 6 illustrates graphs depicting a relation between a target time set for discovering a slave device for each advertisement data transmission period of the slave within a specific time interval and a scan window size. FIG. 6A is a graph of a case when the advertisement data transmission period is 800 milliseconds, and FIG. 6B is a graph of a case when the advertisement data transmission period is 500 milliseconds.

In detail, FIGS. 6A and 6B illustrate an average value of a scan window size according to a target time when the scan window size is set according to a discovery time corresponding to the target time among the discovery time information according to each advertisement data transmission period. Although the average value of the scan window size is illustrated in a unit of a second as an example, the scan window size may be a value indicating a probability (%) to discover a specific slave device in the corresponding slave device on the probability distribution, in addition to the average value thereof.

Referring to FIG. 6A, for example, when the target time is set to 6 seconds, the scan window size is set to be a scan window size corresponding to 6 seconds among the discovery time information. As a result, the scan window size can be set to be 100 milliseconds. Referring to FIG. 6B, for example, when the target time is set to 10 seconds, the scan window size is set to be a scan window size corresponding to 10 seconds among the discovery time information. That is, the scan window size according to this content may be set to 50 milliseconds.

FIGS. 7A and 7B illustrate signal timing generated for connection and reconnection between devices according to another embodiment of the present disclosure. Referring to FIGS. 7A and 7B, the slave device 20 cyclically broadcasts advertisement data 621 from a time point t1. When the master device 10 scans the advertisement data at a specific period, for example, at a time point t2, the master device 10 and the slave device 20 are connected. Although not illustrated in Figures, before and after the link generation, the master device 10 requests the slave device 20 to transmit an advertisement data transmission period, and the slave device 20 transmits the advertisement data transmission period to the master device 10. Further, the advertisement data of the slave device 20 includes the advertisement data transmission period according to a predefined form when the link loss is generated, and the master device 10 can recognize such inclusion. For example, the advertisement data transmission period at the initial linkage and the advertisement data transmission period at the reconnection may have different values.

Thereafter, at a time point t4, when detecting the link loss, the master device 10 identifies the target time, and sets the scan window size according to the identified target time. Here, as mentioned in FIGS. 5 and 6, the set scan window size is set based on the target time within which the slave device can be discovered. Thus, the master device can scan the advertisement data 625 within a scan window size interval set to be a time within which the slave device is to be discovered. Accordingly, the master device does not set an excessive scan window size, so as to reduce power consumption. Further, a link reconnection time is greatly delayed as compared with the target time can be avoided.

As in the description for FIGS. 5 to 7, the master device according to another embodiment of the present disclosure can set the scan window size according to the advertisement data transmission period of the slave device. Here, the scan window size set by the master device accords with the information on the target time within with the slave device can be discovered according to the corresponding scan window size pre-stored by the master device. Thus, the master device identifies a target time within which the slave device is wanted to be discovered and sets the scan window by substituting the identified target time for the stored target time. Accordingly, the master device can set the scan window size with respect to a probability properly determined by the slave device. Meanwhile, the master device can set a common period preset in the master device and the slave device as the advertisement data transmission period without receiving information from the slave device. A detailed description for this content will be described below with reference to FIG. 8.

Figure 8:
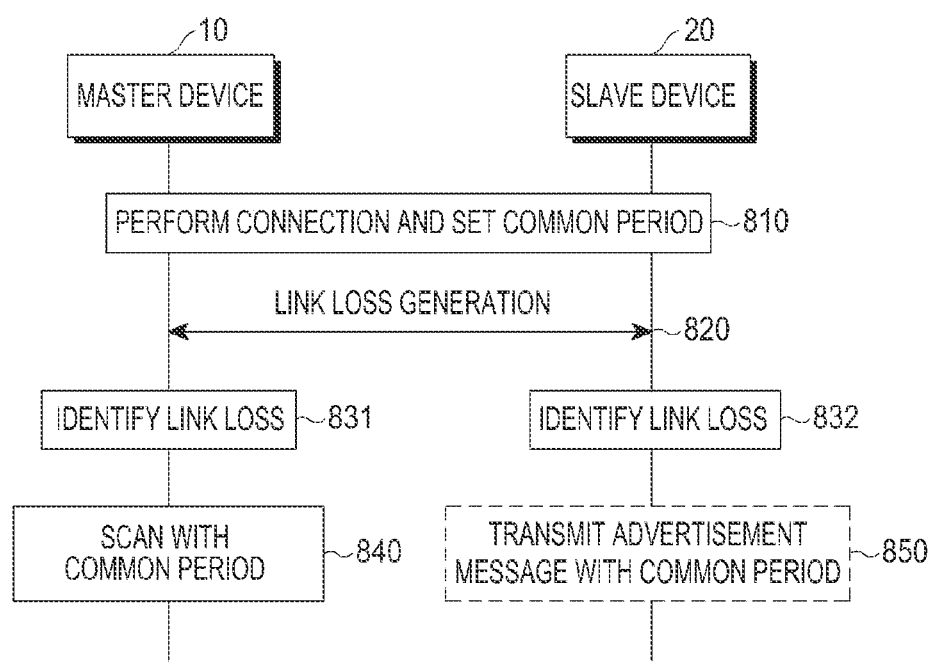
FIG. 8 is a signal flow diagram illustrating an operation of reconnecting a master device and a slave device according to yet another embodiment of the present disclosure.

FIG. 8 is a signal flow diagram illustrating an operation of reconnecting a master device and a slave device according to yet another embodiment of the present disclosure. Referring to FIG. 8, in operation 810, it is assumed that a link for the BLE communication between the master device 10 and the slave device 20 is generated. Here, the link generation is set as the slave device broadcasts the advertisement data according to the general BLE communication method and the master device scans the broadcasted advertisement data. After the link generation, the master device 10 and the slave device 20 enter a connection operation. In detail, in the connection operation, an anchor point is preset for the master device 10 and the slave device 20. Here, the anchor point may be a period in which the connection is updated at each common period commonly set for the master device 10 and the slave device 20.

Further, in the master device 10 and the slave device 20, a scanning period of a scanning operation to be performed at the link loss and an advertisement data transmission period are set to have the common period. Thereafter, when the link loss is generated in operation 820, the master device 10 and the slave device 20 can identify the link loss, in operation 831 and operation 832, respectively. Further, in operation 840, the master device 10 starts a scanning operation after the link loss, at the set common period. Further, the slave device 20 also starts transmission of the advertisement data at the set common period. At this time, a start time point of the scanning operation performed by the master device 10 is set to be an anchor point updated at the common period subsequent to the time point when the link loss is detected. Thereafter, in operation 840, the master device 10 scans advertisement data with the updated common period.

Meanwhile, the slave device 20 may set the advertisement data transmission period as the preset common period, in operation 850, after identifying the link loss in operation 832. At this time, the slave device 20 updates a next common period to the anchor point, at the anchor point of the previous connection time point, according to various embodiments of the present disclosure. Further, the slave device 20 sets the updated anchor point as a starting point of the transmission of the advertisement data, and starts the transmission of the advertisement data at the anchor point repeatedly updated at each common period.

In the operation illustrated in FIG. 8, a starting reference point of the scanning period of the master device and a starting reference point of the advertisement data transmission period of the slave device may coincide with each other, so that the reconnection operation can be performed more promptly.

Figure 9:
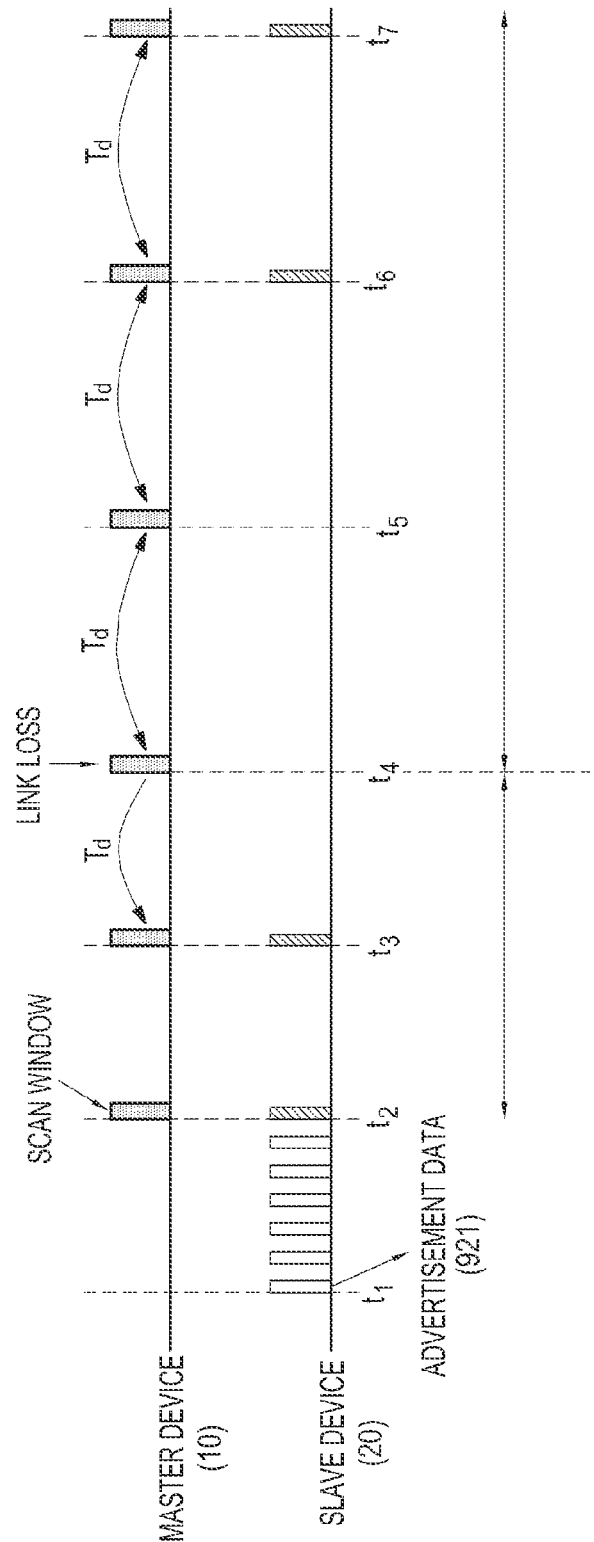
FIG. 9 illustrates signal timing generated for connection and reconnection between devices according to yet another embodiment of the present disclosure.

FIG. 9 illustrates signal timing generated for connection and reconnection between devices according to yet another embodiment of the present disclosure. Referring to FIG. 9, for the link generation of the master device 10, the slave device 20 cyclically broadcasts advertisement data 921 at a time point t1. Thereafter, when the master device 10 scans the advertisement data 921, the master device 10 and the slave device are connected. After the link generation, the master device 10 and the slave device 20 can perform the BLE communication. Further, the master device 10 may maintain the connection operation with the slave device 20 at a connection time point, e.g. time points t2 and t3. Thereafter, the link loss is generated at a time point t4, and the master device 10 which has identified the link loss updates, for example, a time point t5 as an anchor point, and sets Td which is a common period set with the slave device 20 at the connection time point, as a scanning period value of the scan window. At this time, Td may also be set to be equal to the previous connection period. Meanwhile, the slave device 20 which has also identified the link loss can broadcast the advertisement data at an anchor point set to be equal to that of the master device 10. For example, after the link loss, the broadcasting start time point may be time points t5, t6 and t7. Further, the slave device 20 sets the advertisement data transmission period to be Td equally to the scanning period of the mater device 10. Further, a starting time point of the broadcasting period of the advertisement data is updated at each common period based on the previous anchor point, to coincide with a generation time point of a next scanning period of the scan window. Through such an operation, for example, advertisement data may be generated at a time point t6 illustrated in FIG. 9. Thus, when the master device 10 scans the advertisement data at the time point t6, the master device 10 and the slave device can be reconnected.

As in the description for FIG. 9, the master device can increase a probability to scan the advertisement data broadcasted from the slave device, by the operation according to the yet another embodiment. Meanwhile, in the connection operation, the current connection state is identified while the master device 10 transmits/receives a connection identification signal and the slave device transmits/receives a response signal for the connection identification signal. At this time, each device can identify an error between a time point when the signal is transmitted/received actually and a time point when the signal is identified. Thus, as a modified example of the yet another embodiment, an operation considering the error generated at the connection operation can be performed. That is, for example, the slave device 20 may update an anchor point by adding a delta value which is the error value to the anchor point updated after the link loss, and may set a starting reference of a new advertisement data broadcasting period, based on the updated anchor point. A detailed description for this content will be described below with reference to FIG. 10.

Figure 10:
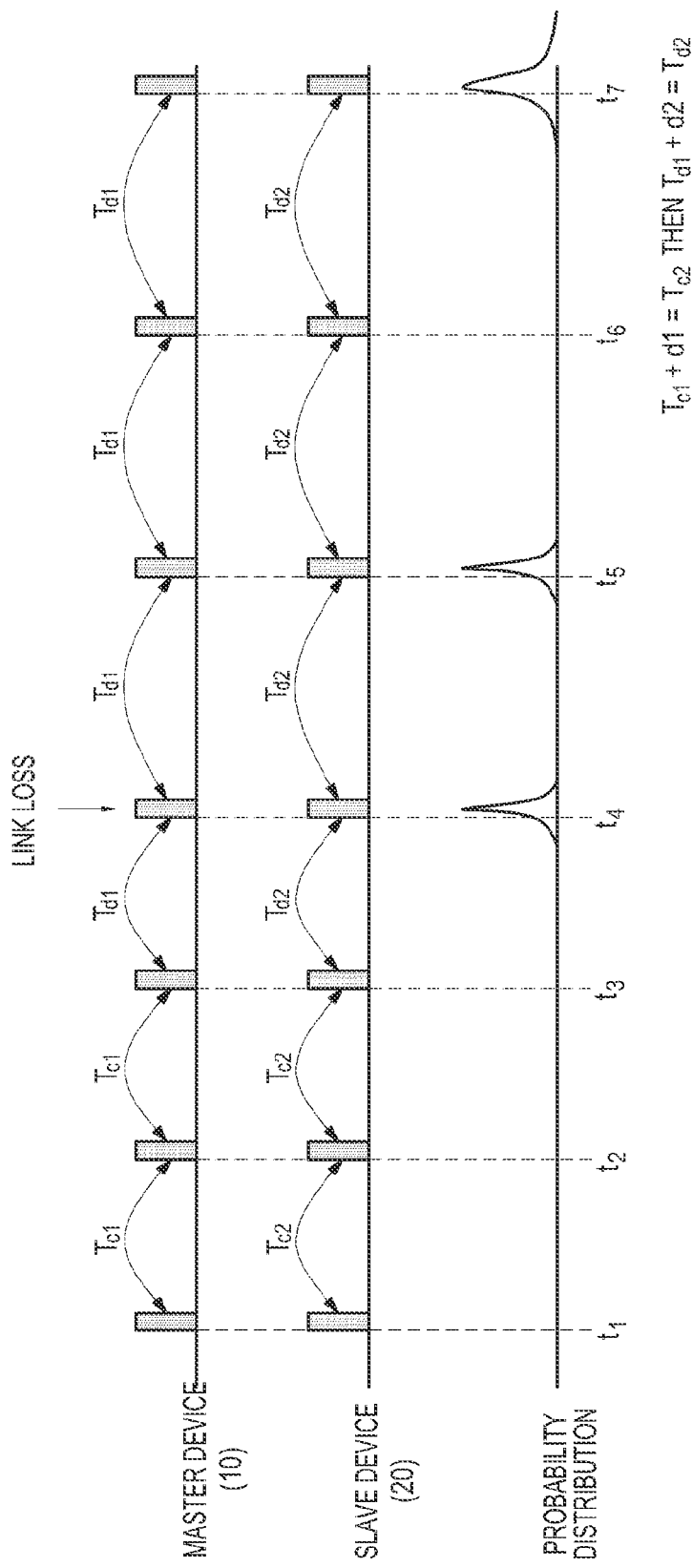
FIG. 10 illustrates signal timing generated for connection and reconnection between devices and probability distribution for the signal timing, according to a modified operation of yet another embodiment of the present disclosure.

FIG. 10 illustrates signal timing generated for connection and reconnection between devices and probability distribution for the signal timing, according to a modified operation of yet another embodiment of the present disclosure. Referring to FIG. 10, it is assumed that the scanning period of the master device 10 is set as, for example, $T_{c1}$. Further, the slave device 20 may set $T_{c2}$ which is a period having a high probability that the advertisement data is scanned, and may broadcast the advertisement data with the period $T_{c2}$. At this time, $T_{c2}$ becomes a value obtained by calibrating an error value d1 from $T_{c1}$. Here, d1 is an error value between a connection time point determined by the master device 10 and an actual connection time point, at the connection operation. The determined connection time point may be an anchor point updated according to the common period set by the master device 10. Further, it is assumed that the current link between the master device 10 and the slave device 20 is in a connected state according to the advertisement data broadcasting and the scanning operation. Thereafter, when the link loss is generated at a time point t4, the master device can generate a scanning signal as of a generation time point of the scan window at the previous connection, for example, according to a preset scanning period $T_{d1}$.

At this time, the slave device 20 broadcasts the advertisement data with a period $T_{d2}$ obtained by calibrating an error value d2 from $T_{d1}$ which is the preset advertisement data broadcasting period, which is equal to the master device 10. Here, d2 is an error value between a connection time point determined by the slave device 20 and an actual connection time point, at the connection operation. The determined connection time point may be an anchor point updated according to the common period set by the slave device 20. At this time, the generation time point of the broadcasting period of the advertisement data is generated as of the previous connection time point.

The probability distribution illustrated in FIG. 10 illustrates a probability that the scan window, which performs scanning with the common period, scans the advertisement data broadcasted with the common period. A scanning period of the master device 10 according to the modified example of the yet another embodiment is similar to the advertisement data transmission period of the slave device 20. Accordingly, it can be seen that a probability that the scan window scans the advertisement data at each of the time points corresponding to the period, for example, the time points t4, t5 and t7 is high. Further, when a time of each anchor point updated from the time point t4 to the time point t7, that is, from the time point of the link loss is delayed, it can be seen that a variance of the probability distribution at each time point becomes larger. Accordingly, the scan window size or the broadcasting period of the advertisement data can be changed by using the variance of the probability distribution. Also, in order to prevent the variance value from increasing to be larger than a predetermined value, another external time information in addition to a Bluetooth chip is used. For example, each of the master device and the slave device may compare the identified scanning period and the advertisement data transmission period with objective values. Each device may identify an error generated by comparing the coordinated universal time, which is an example of the objective value, with the scanning period or the advertisement data transmission period. Further, it is assumed that the identified error is larger than an error generated by comparing the another external time information with each period. At this time, each of the master device and the slave device can update the scanning period or the advertisement data transmission period to a value obtained by adding an error generated from the another external time information.

As described above, the operation of setting the scan window size and the scanning period and the device thereof according to embodiments of the present disclosure may be configured. Meanwhile, although the detailed embodiment is described in the aforementioned description of the present disclosure, various modifications can be implemented without departing from the scope of the present disclosure.

For example, although it has been described in the above description that the present disclosure is applied to the portable terminal, the present disclosure can be applied to any electronic device which can perform the BLE communication, such as a notebook, a general Personal Computer (PC), etc.

Further, although the method of the reconnection, when the link loss is generated at the time of the BLE connection, has been described in the above embodiments, the present disclosure can be also applied to short-range wireless communication connection. For example, it is assumed that the link loss is generated at the time of the Bluetooth connection and the reconnection is performed with the BLE. At this time, the method of setting the scan window size/the period, which has been described in the above embodiments, can be applied to a page and inquiry scanning operation of Bluetooth.

Further, although it is described in the descriptions of the above embodiments that the time when the link loss is generated is considered in order to set the scan window size, and the advertisement data transmission period, the error value between the master device and the slave device, etc. are used in order to set the scanning period of the scan window, in addition, it is obvious that the present disclosure can be applied when the scan window size and the scanning period are set by using other information.

It will be appreciated that a memory, which may be incorporated in a portable terminal, may be an example of a machine-readable storage medium which is suitable for storing a program or programs including commands to implement the embodiments of the present disclosure. Accordingly, the present disclosure includes a program that includes a code for implementing an apparatus or a method defined in any claim in the present disclosure and a machine-readable storage medium that stores such a program. Further, the program may be electronically transferred by any communication signal through a wired or wireless connection, and the present disclosure appropriately includes equivalents of the program.

Various embodiments can be made according to various additional applications or modifications and variations of the present disclosure. Thus, the scope of the present disclosure should be determined by not the described embodiments but the appended claims and equivalents of the claims.

What is claimed is:

1. A method of reconnecting communication with a second device by a first device in short-range wireless communication, the method comprising:
   adjusting a scanning period of advertisement data broadcasted by the second device based on a common period set for the first device and the second device in a link, in response to determining that a link loss is generated at the link with the second device;
   determining a size of a scan window in which scanning is performed, according to a time during which the link loss continues;
   updating an anchor point of the first device corresponding to the common period; and
   scanning, at the updated anchor point, the advertisement data at each of the adjusted scanning periods in the scan window corresponding to the determined size.

2. The method of claim 1, wherein adjusting the scanning period and the size of the scan window comprises, when the time during which the link loss continues has a value within a predetermined range, adjusting the scanning period to be smaller than a predetermined period, and adjusting the size of the scan window to be larger than a predetermined size.

3. The method of claim 1, wherein adjusting the scanning period of the advertisement data comprises:
   when link generating with the second device is performed, storing an error value generated while identifying the link generation; and
   adjusting the scanning period of the advertisement data by adding the error value to the adjusted scanning period.

4. The method of claim 3, further comprising:
   calculating an error probability generated when scanning the advertisement data, as the error value is generated;
   adjusting a size of a scan window in which the scanning is performed, by using the calculated error probability.

5. The method of claim 3, further comprising:
   when an error value generated in time information of the first device is larger than an error value generated in external time information, adjusting the adjusted scanning period by adding the error value generated in the external time information.

6. A method of reconnecting communication with a second device by a first device in short-range wireless communication, the method comprising:
   storing size information of a scan window corresponding to each of broadcasting periods;
   storing period information having a highest discovery probability for discovering the second device according to a specific size of the scan window;
   when it is determined that link loss is generated at a link with the second device, identifying a broadcasting period of advertisement data transmitted from the second device;
   identifying a value of a target time for reconnection with the second device, wherein the target time is a period having the highest discovery probability according to the identified broadcasting period based on the period information;
   adjusting a size of the scan window in consideration of the identified broadcasting period based on the size information; and
   scanning, in the identified value of the target time, the advertisement data in the scan window corresponding to the adjusted size.

7. The method of claim 6, further comprising:
   identifying a second target time having the highest discovery probability for discovering the second device according to scanning periods stored for the broadcasting periods of each of a plurality of devices; and
adjusting a scanning period to a period of the second target time.

8. A method of reconnecting communication with a first device by a second device in short-range wireless communication, the method comprising:
determining a transmission period of advertisement data broadcasted to the first device, through communication with the first device;
adjusting the transmission period based on a common period which is set for the first device and the second device in a link, in response to generating a link loss at the link with the first device;
updating an anchor point of the second device corresponding to the common period; and
broadcasting, at the updated anchor point, the advertisement data at each adjusted transmission period.

9. The method of claim 8, wherein adjusting the transmission period of the advertisement data comprises:
when link generation with the first device is performed, storing an error value generated while identifying the link generation; and
adjusting the transmission period of the advertisement data by adding the error value to the adjusted transmission period.

10. The method of claim 9, further comprising:
when an error value generated in time information of the second device is larger than an error value generated in external time information, adjusting the adjusted transmission period by adding the error value generated in the external time information thereto.

11. A first device for reconnecting communication with a second device in short-range wireless communication, the first device comprising:
a controller configured to,
adjust a scanning period of advertisement data broadcasted by the second device based on a common period set for the first device and the second device in a link, in response to determining that a link loss is generated at the link with the second device,
determine a size of a scan window in which the scanning is performed, according to a time during which the link loss continues, and
update an anchor point related to first device corresponding to the common period; and
a short-range communication unit configured to scan, at the updated anchor point, the advertisement data at each of the adjusted scanning periods in the scan window corresponding to the determined size.

12. The first device of claim 11, wherein when the time during which the link loss continues has a value within a predetermined range, the controller is configured to adjust the scanning period to be less than a predetermined period, and the size of the scan window to be larger than a predetermined size.

13. The first device of claim 11, further comprising a memory unit that, when link generation with the second device is performed, stores an error value generated while the link generation is identified,
wherein the controller configured to adjust the scanning period of the advertisement data by adding the error value to the adjusted scanning period.

14. The first device of claim 13, wherein the controller is configured to calculate an error probability generated when the advertisement data is scanned, as the error value is generated, and to adjust a size of a scan window in which the scanning is performed, by using the calculated error probability.

15. The first device of claim 13, wherein when an error value generated in time information of the first device is larger than an error value generated in external time information, the controller is configured to adjust the adjusted scanning period by adding the error value generated in the external time information.

16. A first device for reconnecting communication with a second device in short-range wireless communication, the first device comprising:
a memory unit configured to store size information of a scan window corresponding to each of broadcasting periods and store period information having a highest discovery probability for discovering the second device according to a specific size of the scan window;
a controller configured to, when it is determined that link loss is generated at a link with the second device, identifies a broadcasting period of advertisement data transmitted from the second device, identify a value of a target time for reconnection with the second device, wherein the target time is a period having the highest discovery probability according to the identified broadcasting period based on the period information, and adjust a size of the scan window in consideration of the identified broadcasting period based on the size information; and
a short-range communication unit configured to scan, in the identified value of the target time, the advertisement data in the scan window corresponding to the adjusted size.

17. The first device of claim 16, wherein the controller is configured to identify a second target time having the highest discover probability for discovering the second device according to scanning periods stored for the broadcasting periods of each of a plurality of devices, and to adjust a scanning period to a period of the second target time.

18. A second device for reconnecting communication with a first device in short-range wireless communication, the second device comprising:
a controller configured to:
determine a transmission period of advertisement data broadcasted to the first device, through communication with the first device,
adjust the transmission period based on a common period which is set for the first device and the second device in a link, in response to determining that a link loss is generated at the link with the first device, and
update an anchor point of the second device corresponding to the common period; and
a short-range communication unit configured to broadcast, at the updated anchor point, the advertisement data at each adjusted transmission period.

19. The second device of 18, further comprising a memory unit that, when link generation with the first device is performed, stores an error value generated while the link generation is identified,
wherein the controller is configured to adjust the transmission period of the advertisement data by adding the error value to the adjusted transmission period.

20. The second device of claim 19, wherein when an error value generated in time information of the second device is larger than an error value generated in external time information, the controller is configured to adjust the adjusted transmission period by adding the error value generated in the external time information thereto.

* * * * *